United States Patent [19]
Dobler et al.

[11] Patent Number: 5,651,604
[45] Date of Patent: Jul. 29, 1997

[54] ILLUMINATION DEVICE FOR VEHICLES

[75] Inventors: Karl-Otto Dobler, Reutlingen; Jan Fischer, Tübingen, both of Germany

[73] Assignee: Robert Bosch GmbH, Stuttgart, Germany

[21] Appl. No.: 648,341

[22] Filed: May 15, 1996

[30] Foreign Application Priority Data

May 30, 1995 [DE] Germany .................. 1 95 19 653.8

[51] Int. Cl.$^6$ .................................................. B60Q 1/08
[52] U.S. Cl. .................................... 362/69; 362/61
[58] Field of Search .......................... 362/66, 69, 61

[56] References Cited

U.S. PATENT DOCUMENTS 5,497,300  3/1996  Haug ............................... 362/66
5,567,034  10/1996  Dietewich et al. ............... 362/66

FOREIGN PATENT DOCUMENTS 30 30 427 A1  3/1982  Germany .

*Primary Examiner*—Carroll B. Dority
*Attorney, Agent, or Firm*—Michael J. Striker

[57] ABSTRACT

An illumination device for a vehicle comprises at least one reflector, at least one light source, a housing part at least partially surrounding the reflector and the light source and having a front side provided with a light outlet opening, a light permeable cover member closing the light outlet opening, the housing part being mountable on a front part of the vehicle, the housing part being frame-shaped and having a rear side which faces away from the cover member and being open, the housing part having a rear edge insertable into a cup-shaped depression of the vehicle part, an elastically deformable sealing element provided between an outer periphery of the housing part and an inner periphery of the depression and being elastically deformable in a direction transverse to the insertion direction of the housing part, so that the cover member, the housing part and the depression limit a closed inner chamber accommodating the reflector and the light source.

5 Claims, 1 Drawing Sheet

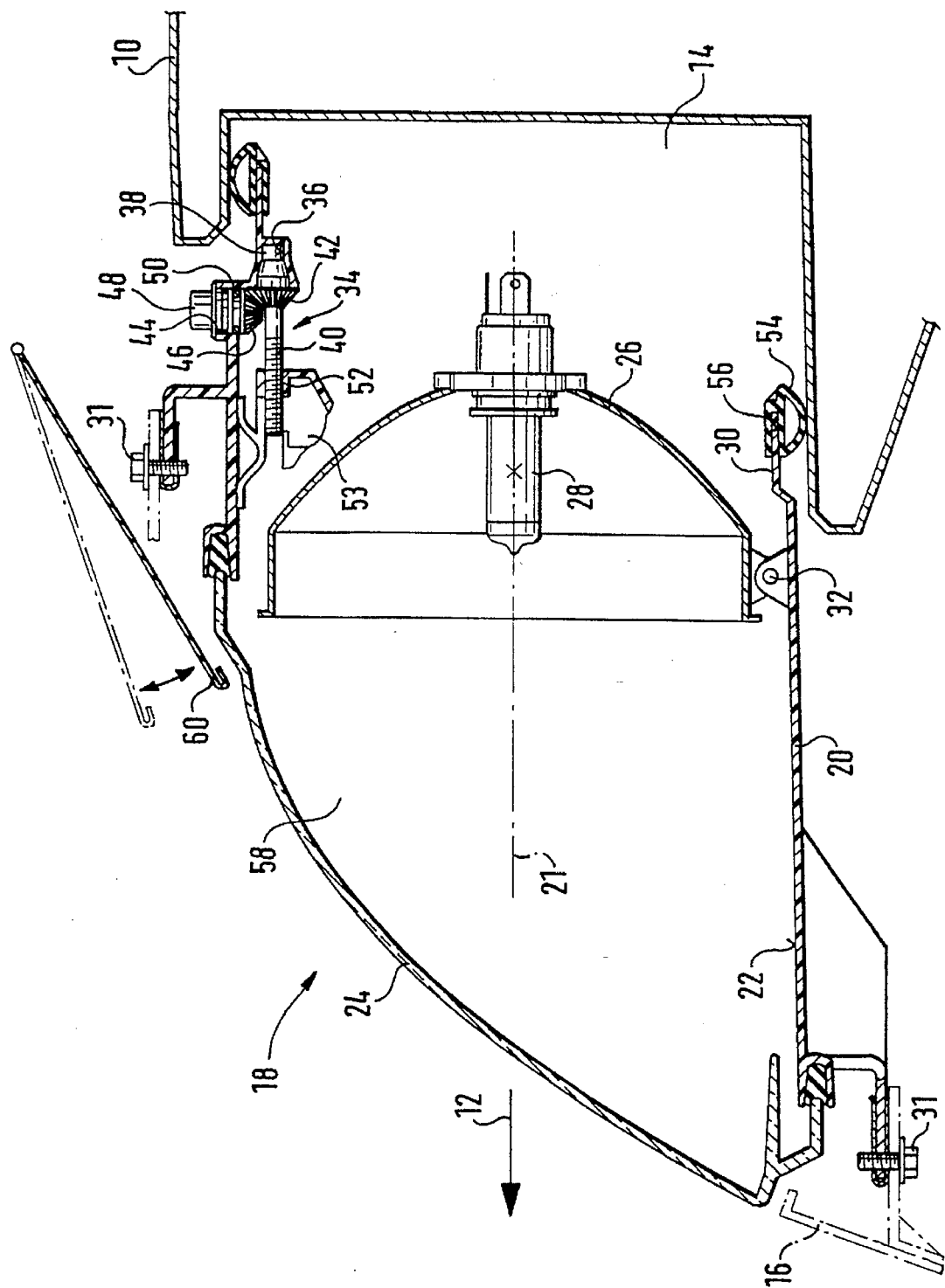

ILLUMINATION DEVICE FOR VEHICLES

BACKGROUND OF THE INVENTION

The present invention relates to an illumination device for vehicles.

Illumination devices are generally known in the art. One of such illumination devices is disclosed, for example, in the German document DE 30 30 427 A1. The illumination device is formed as a headlight and has a housing part which surrounds at least one reflector and at least one light source. The housing part is provided with a light outlet opening at its front end, and a light-permeable cover member closes the light outlet opening. The housing part is mountable on a front part of the vehicle and has a rear wall which is opposite to the cover member and is provided with an opening closeable by a separate closure part. A closed inner chamber is formed by the housing part, the closure part and the cover member, and the reflector and the light source are arranged in this closed inner chamber to be protected from dirt and moisture. The housing part with the closure part consume a lot of material for their manufacture, and also occupy a substantial mounting space, which naturally is not desirable.

SUMMARY OF THE INVENTION

Accordingly, it is an object of the present invention to provide an illumination device for vehicles, which avoids the disadvantages of the prior art.

In keeping with these objects and with others which will become apparent hereinafter, one feature of the present invention resides, briefly stated, in an illumination device for vehicles, in which the housing part is frame-shaped and is open at its rear side facing away from the cover member, a vehicle part has a cup-shaped depression in which the housing part is insertable with its rear edge, and between the outer periphery of the housing part and the inner periphery of the depression an elastically deformable sealing element is tensioned transversely to the insertion direction of the housing part, so that a closeable inner chamber limited by the cover member, the housing part and the depression is formed for accommodation of at least one reflector and at least one light source.

When the illumination device for vehicles is designed in accordance with the present invention, a smaller material consumption is needed for the housing part since it does not have a rear wall. Also, in the case of manufacturing tolerances of the housing part and/or the vehicle part having the depression, a secure sealing of the inner chamber is obtained. The displaceability of the housing part in the depression compensates the manufacturing tolerances in the insertion direction of the housing part, and the elastically deformable sealing element compensates the manufacturing tolerances transversely to the insertion direction of the housing part.

In accordance with a further advantageous feature of the present invention, the illumination device is pre-mountable on the front part and the front part is mountable on the vehicle part provided with the depression, and during the mounting of the front part on the vehicle part the rear edge of the housing part is introduced in the depression. With this construction, the sealing element can compensates relatively great manufacturing tolerances transversely to the insertion direction of the housing part with reliable sealing of the inner chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawing is a view showing an illumination device in accordance with the present invention, in a vertical section and mounted on a vehicle part.

DESCRIPTION OF THE PREFERRED EMBODIMENTS

A vehicle, in particular a motor vehicle, is shown in the drawings only partially. In particular, its front vehicle part 10 is shown in the drawings, which can be a part of the chassis of the vehicle or a support. It can be composed of metal, for example cast metal or metal plate, or a synthetic plastic material. The vehicle part 10 has an end side which faces in a traveling direction 12 of the vehicle and is provided at the end side with at least one cup-shaped depression 14 arranged opposite to the traveling direction 12. The depression 14 is closed on its side walls and its bottom. Usually, one depression 14 is formed on both lateral edge regions of the vehicle part 10. The depression 14 can be formed so that its opening expands toward the front edge in the traveling direction 12, for example conically.

A front part 16 for the vehicle is mountable on the vehicle part 10. It is displaced opposite to the traveling direction 12 on the vehicle part 10 and mountable on the vehicle part by not shown mounting elements. At least one illumination device 18 is mounted on the front part 16, for example in form of a headlight. Further parts and aggregates of the vehicle can be mounted on the front part 16. Usually one headlight 18 is mounted on both lateral edge regions of the front part 16. The headlight 16 has a frame-shaped housing part 20 with a light opening 22 at its front end facing the traveling direction 12. The light opening 22 is closed by a light permeable cover member 24 composed of glass or synthetic plastic material.

The housing part 20 can have a round, rectangular, or another cross-section. The housing part 20 is composed for example of a synthetic plastic material. However, it can be also composed of another suitable material, for example sheet metal or cast metal. The cover member 24 can be smooth or it can be provided with optically effective elements so as to deviate the light passing through it. The cover member 24 has a peripheral edge mounted on the front end of the housing part 20. The mounting can be performed for example by glueing, or one or several holding clamps, or by an arresting connection.

A first reflector 26 is supported on the housing part 20 and partially surrounded by the latter. At least one light source 28 is insertable into the reflector from its rear side and arranged in its apex region. The light source 28 can be formed as a incandescent lamp or gas discharge lamp. The housing part 20 is open at its rear side which is opposite to the cover member 24 and faces in the traveling direction 12. It has a circumferential edge 30 which surrounds the opening at its rear side. The edge 30 can be arranged in a plane extending perpendicular to the traveling direction 12, or as shown in the drawing, it can be arranged in a plane which is inclined relative to a vertical plane. The edge 30 can have a small gap relative to the region of the housing part 20 arranged further in the traveling direction 12. The housing part 20 is mounted on the front part 16 by means of one or several screws 31.

The reflector 26 is arranged in the housing part 20 displaceably and turnably over at least one horizontal axis 32 extending substantially perpendicular to the longitudinal axis 21 of the housing part 2. The axis 32 is arranged for example at the lower edge region of the reflector 26. For displacement of the reflector 26, a displacing device is provided and includes a displacement screw 34. The displacement screw 34 has a pin 38 which is rotatably supported near the rear side of the housing part 20 in a blind hole 36 which opens in the traveling direction 12. It also has a threaded shaft 40 facing in the traveling direction 12. The displacement screw 34 is arranged substantially horizontally. A bevel gear 42 provided with teeth facing in the traveling direction 12 is formed at the transition from the pins 38 to the threaded shaft 40. The housing part 20 is provided with an opening 44 at its upper side. The opening 44 is offset relative to the bevel gear 42 of the displacement screw 34 in the traveling direction 12, and a bevel gear 46 is inserted in it from above so as to engage with its teeth into the housing part 20 and to be in engagement with the teeth of the bevel gear 42 of the adjustment screw 34. The bevel gear 46 is arranged substantially perpendicular to the adjusting screw 34 and is provided with an actuating portion 48 arranged outside of the housing part 20. The actuating portion 48 is formed for example as an outer or inner hexagon, and also can be formed as transverse or intersecting slots, so that it can be engaged by a suitable tool. The bevel gear 46 is secured by a securing element 50 which is fitted on its portion extending in the housing part 20. The securing element is formed for example as a securing ring to provide securing from pulling out. The threaded shaft 40 of the adjusting screw 34 is screwed into a nut part 52 formed on the displacement element 53 mounted on the reflector 26. It is displaceable on the housing part 20 in the longitudinal direction of the adjusting screw 34, and at the same time is non-rotatable. The nut part 52 can also be arranged directly on the reflector 26 and formed with one piece with the reflector.

During a rotation of the bevel gear 46, the displacing screw 34 is turned and through its threaded connection with the nut part 52, turns the nut part 52 and through it the reflector 26 on its upper edge region around the axis 32, so that the orientation of the light beam reflected by the reflector 26 in a vertical direction is adjusted. The reflector 20 can be additionally supported on the housing part 20 turnably about a vertical axis. Then, for turning the reflector 26 about the vertical axis, a further adjusting device is provided with an actuating element accessible from outside of the housing part 20.

A circumferential sealing element 54 is fitted on the edge 30 of the housing part 20 from its rear side. It projects outwardly from the housing part 20. The sealing element 54 has a circumferential groove 56 in which the edge 30 of the housing part 20 is inserted. The outwardly projecting part of the sealing element 54 is formed as a hollow profile and convexly curved outwardly. Therefore, the sealing element 54 is elastically deformable transversely to the longitudinal axis 21 of the housing part 2 over a broad region.

The mounting of the headlight 18 as well as the front part 16 on the vehicle part 10 is performed in the following manner. The headlight 18 or the both headlights are first mounted with their housing parts 20 on the front part 16 by the screw 31. Then the front part 16 is moved opposite to the traveling direction 12 on the vehicle part 10. The rear edge 30 of each housing part 20 with the sealing element 54 arranged on it is inserted with a respective depression 14 of the housing part 10. The edge 30 of the housing part 20 has a smaller outer cross-section than the inner cross-section of the depression 14, so that between the outer periphery of the edge 30 and the inner periphery of the depression 14 a circumferential gap remains which is compensated by the sealing element 54. A closed inner chamber 58 is limited by the housing part 20, the cover member 24 and the depression 14 of the vehicle part 10, and at least one reflector 26 and the light source 28 are arranged in the inner chamber. The housing part 20 is freely displaceable with the depression 14 along its insertion direction or in other words in or opposite to the opposite direction 12. Thereby the manufacturing tolerances of the housing part, 20, the front part 16 and the vehicle part 10 along the insertion direction 12 are compensated, and independently from this, the housing part 20 is inserted with its rear edge 30 into the depression 14. The depth of the depression 14 along the insertion direction 12 of the housing part 20 is selected so that the housing part 20 also in the event of unfavorable manufacturing tolerances does not come to abutment with its rear edge 30 against the bottom of the depression 14. The sealing element 54 comes to abutment with its circumferential, radial outer periphery facing away from the longitudinal axis 21 of the housing part 20, against the inner periphery of the depression 14 and seals the inner chamber 50. Because of the elastic deformability of the sealing element 54 in broad regions, the manufacturing tolerances of the housing part 20, the front part 13, and the vehicle part 10 transversely to the insertion direction 12 of the housing 20 are compensated, and a reliable sealing of the inner chamber 15 is obtained independently from it. The actuating portion 48 of the bevel gear 46 for displacement of the reflector 26 is arranged outside the depression 14 and available from above the housing part 20.

In deviation from the above described, the headlight 18 can be mounted directly on the vehicle part 10. The shape of the headlight 18 and the vehicle part 10 with the depression 14 are not changed in this case. A movable flap 60 can be arranged on the front part 30 or the vehicle part 10 and formed for example as a part of the chassis of the vehicle. The flap 60 at least partially covers a gap provided between the periphery of the headlight 18 and the adjoining front part 16 or the vehicle part 10. The flap 60 can be arranged for example turnably between a position shown with solid lines in the drawing, in which it covers the gap, and a position shown in the drawing in dotted lines in which it is turned back so as to open the gap. In the turned back position of the flap 60, the headlight 18 is mountable and dismountable. Also, the actuation portion 48 of the bevel gear 46 is available for adjustment of the reflector 26 from the front side of the vehicle.

It will be understood that each of the elements described above, or two or more together, may also find a useful application in other types of constructions differing from the types described above.

While the invention has been illustrated and described as embodied in an illumination device for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An illumination device for a vehicle, comprising at least one reflector; at least one light source; a housing part at least partially surrounding said reflector and said light source and having a front side provided with a light outlet opening; a light permeable cover member closing said light outlet opening, said housing part being mountable on a front part of the vehicle, said housing part being frame-shaped and having a rear side which faces away from said cover member and being open, said housing part having a rear edge insertable into a cup-shaped depression of the vehicle part; an elastically deformable sealing element provided between an outer periphery of said housing part and an inner periphery of the depression and being elastically deformable in a direction transverse to an insertion direction of said housing part, so that said cover member, said housing part and said depression limit a closed inner chamber accommodating said reflector and said light source.

2. An illumination device as defined in claim 1, wherein said sealing element is fitted on said rear edge of said housing part.

3. An illumination device as defined in claim 1, wherein said sealing element is formed as a hollow profiled element.

4. An illumination device as defined in claim 1; and further comprising a displacing device for displaceably supporting said reflector on said housing part, said displacing device having an actuating element extending outside of said housing part and arranged outside of said depression.

5. An illumination device as defined in claim 1, wherein said illumination device is pre-mountable on said front part, said front part being mountable on the vehicle part having the depression, so that during mounting of the front part on the vehicle part said rear edge of said housing part is inserted in said depression.

* * * * *